United States Patent

[19] Frost et al.

[11] 4,042,194
[45] Aug. 16, 1977

[54] PARACHUTE HARNESS RELEASE MECHANISM

[75] Inventors: Richard H. Frost, Littleton; Ronald L. Criley, Lake City, both of Colo.

[73] Assignee: Frost Engineering Development Corporation, Englewood, Colo.

[21] Appl. No.: 691,351

[22] Filed: June 1, 1976

[51] Int. Cl.² .......................................... B64D 17/32
[52] U.S. Cl. .............................................. 244/151 A
[58] Field of Search ........... 244/151 R, 151 A, 151 B, 244/141; 24/73 PH, 230 A, 230 AV

[56] References Cited

U.S. PATENT DOCUMENTS

| 3,658,281 | 4/1972 | Gaylord | 244/151 A |
| 3,744,103 | 7/1973 | Gaylord | 244/151 A X |
| 3,767,143 | 10/1973 | Gaylord | 244/151 A |
| 3,785,597 | 1/1974 | Gaylord | 244/151 A |

Primary Examiner—Trygve M. Blix
Assistant Examiner—Barry L. Kelmachter

Attorney, Agent, or Firm—Crandell & Polumbus

[57] ABSTRACT

A parachute harness release mechanism for use on a parachute harness such as a torso restraint garment vest carrying releasable buckles for connection with parachute riser shoulder harness straps, releasable buckles for connection with survival kit lap belts, and an oxygen mask hose terminating in a releasable coupling for connection with an oxygen supply conduit. The release mechanism includes a hand operated control with a compressed air supply connectable selectively to either the releasable parachute riser shoulder harness strap buckles or alternatively to all of the releasable buckles and the oxygen hose coupling. In the latter mode, the compressed air is further connected to a pressure reducing valve for supplying air to the oxygen pressure regulator, mask hose, and mask for a time sufficient to enable the crewman to escape from the aircraft even though it is underwater or surrounded by fire, dense fumes or smoke.

22 Claims, 17 Drawing Figures

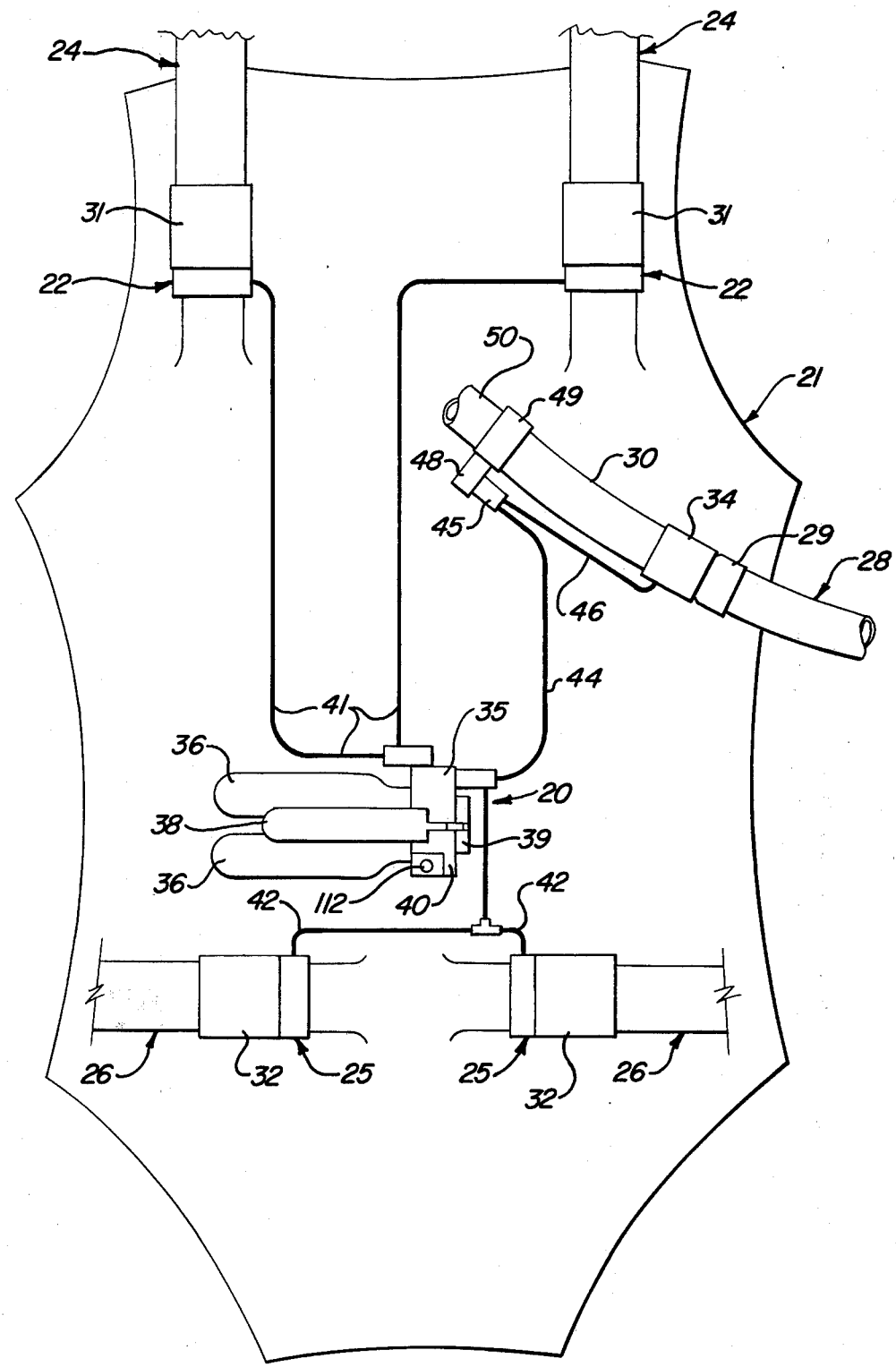
Fig_1

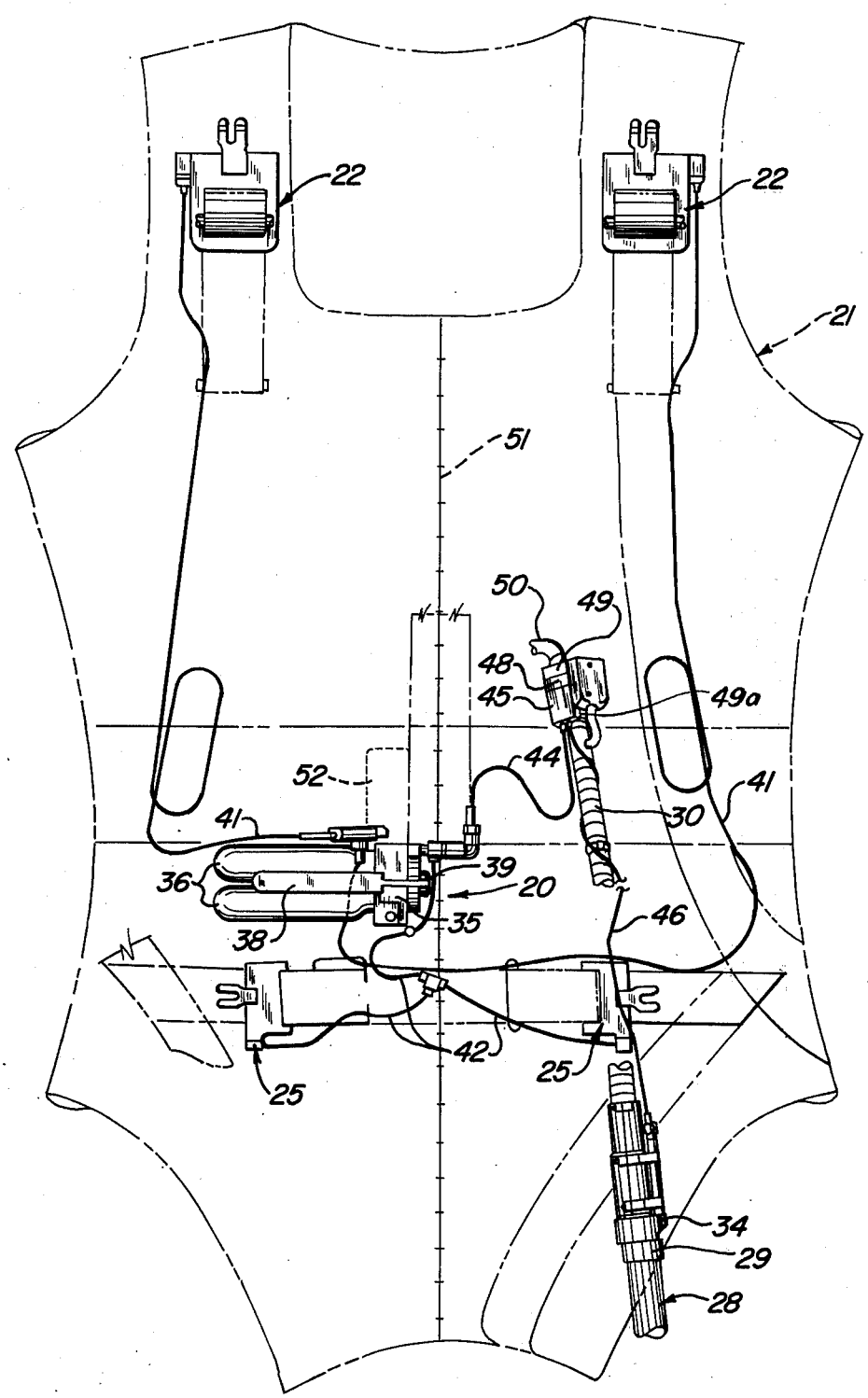
Fig _ 2

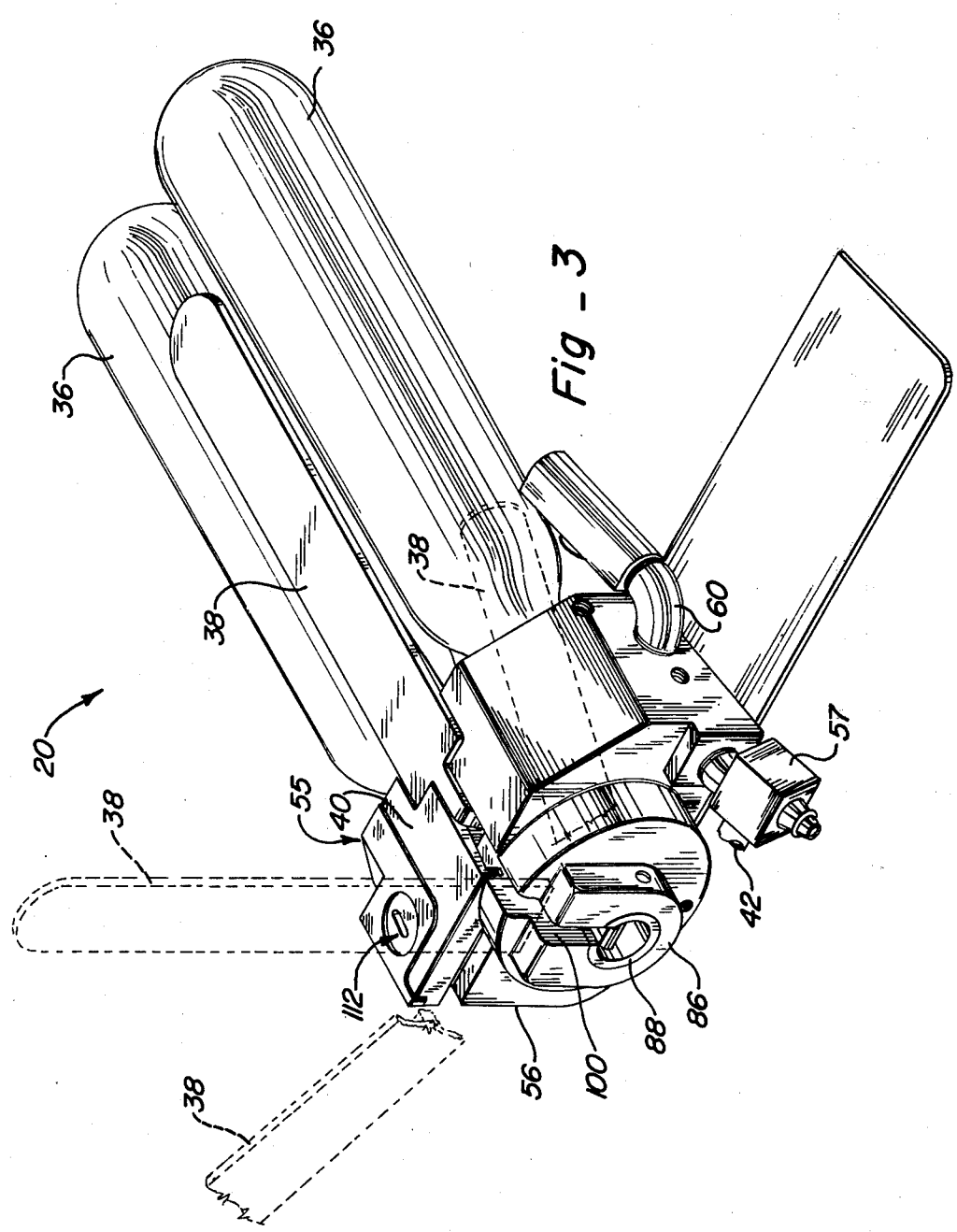

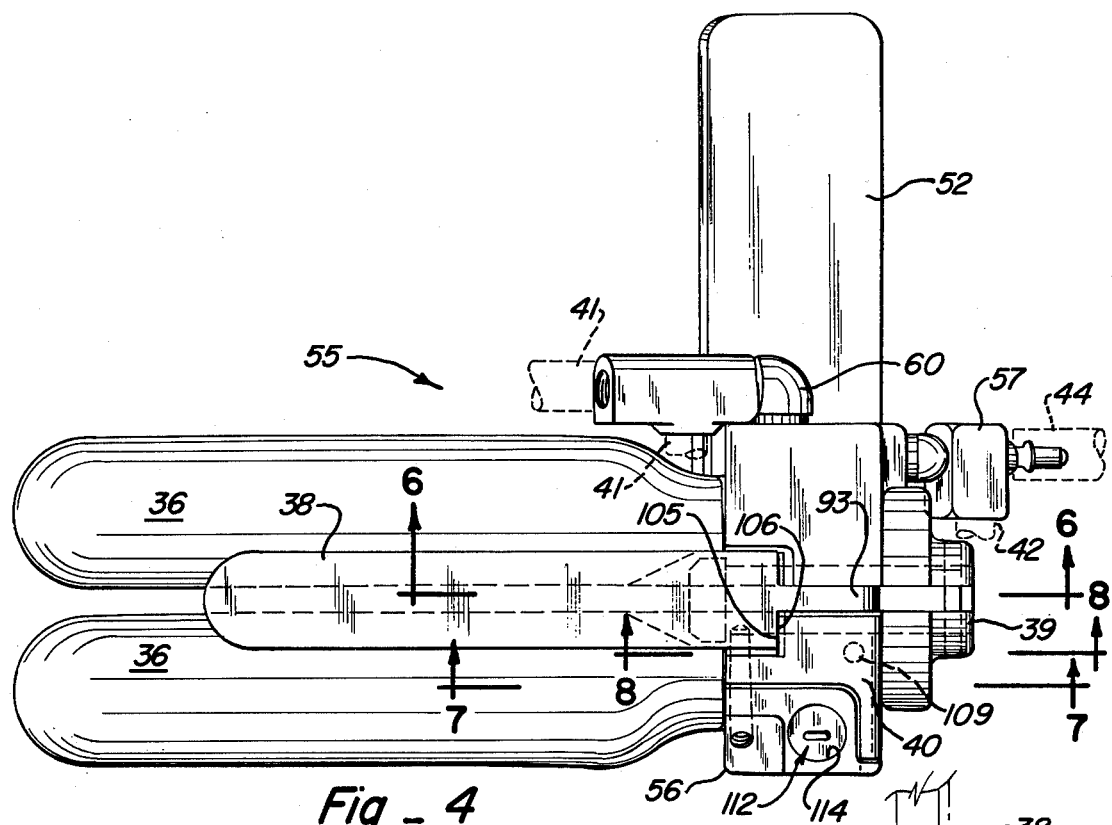
Fig_4
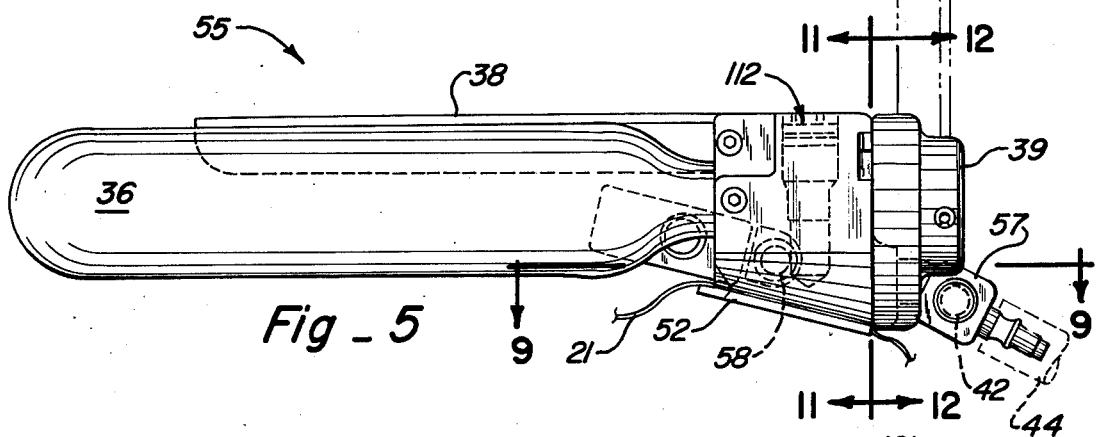
Fig_5
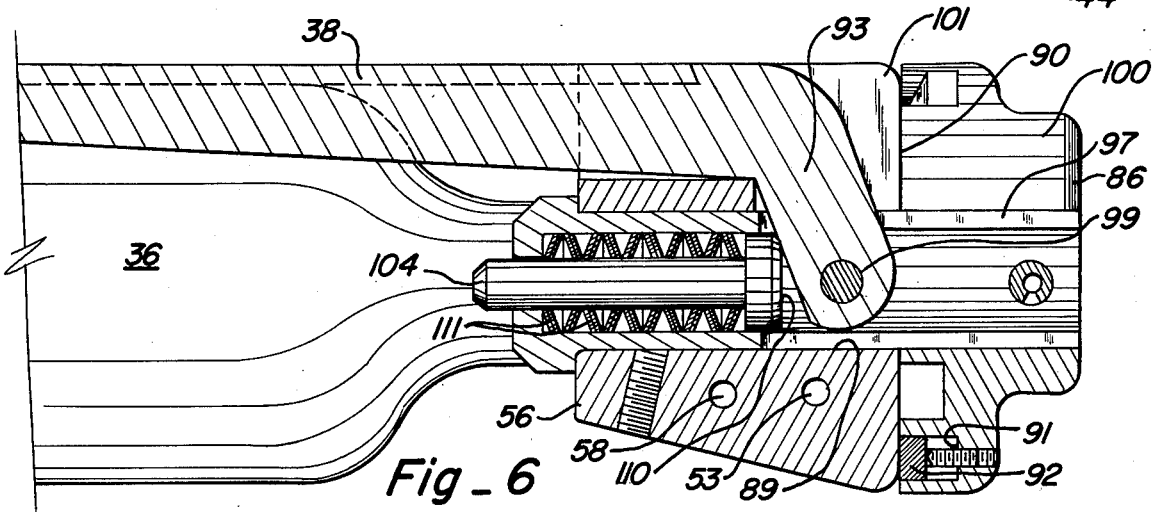
Fig_6

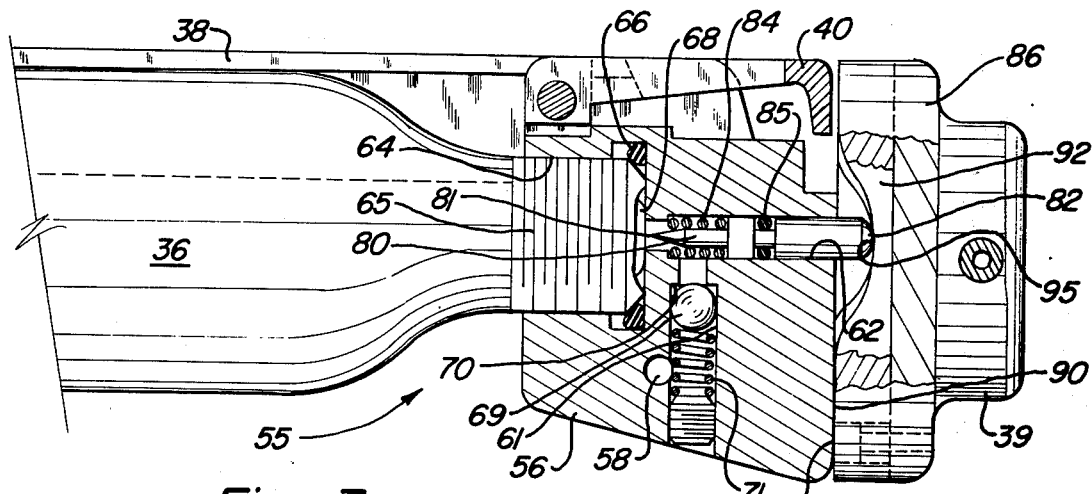
Fig_7
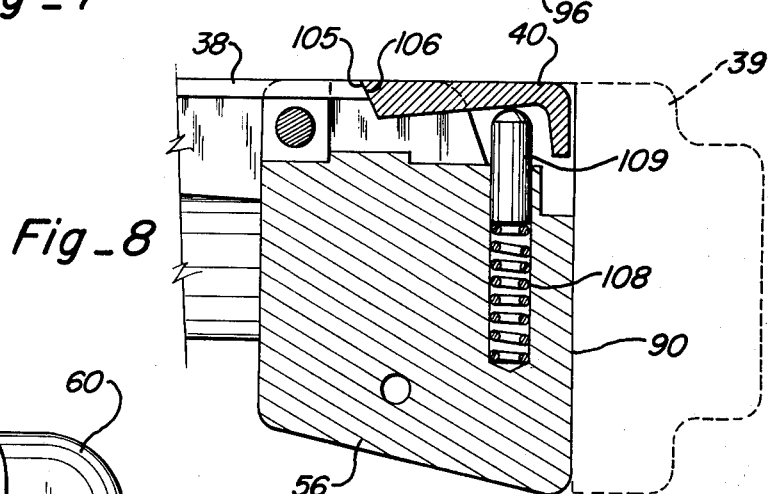
Fig_8
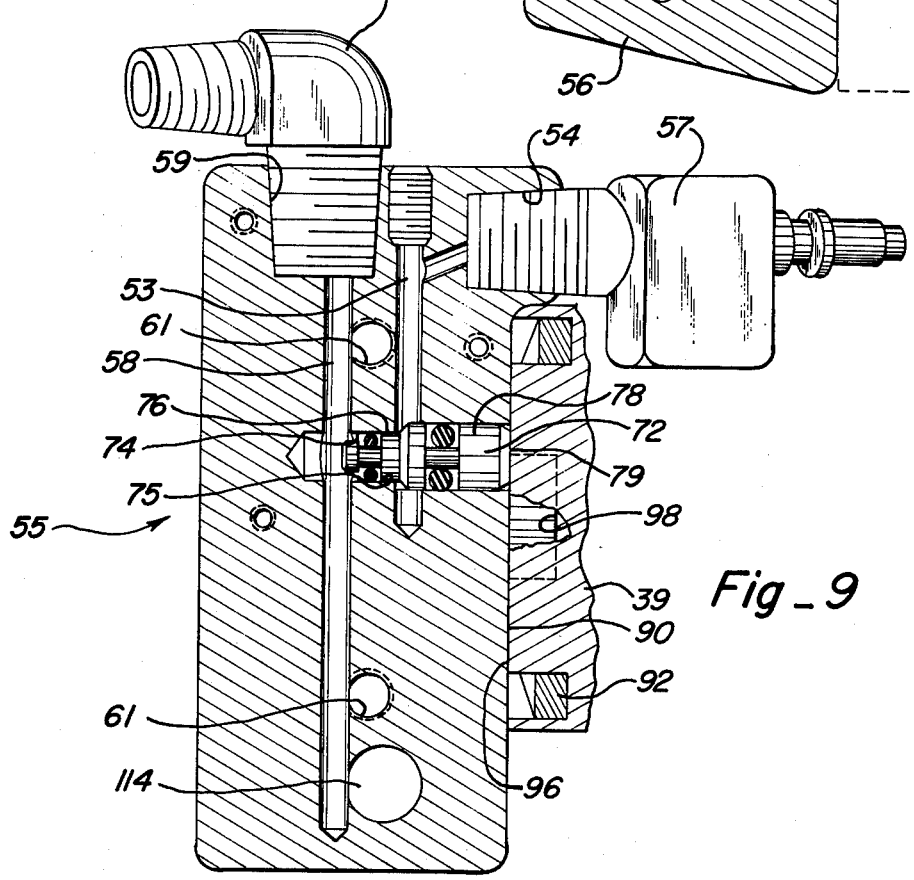
Fig_9

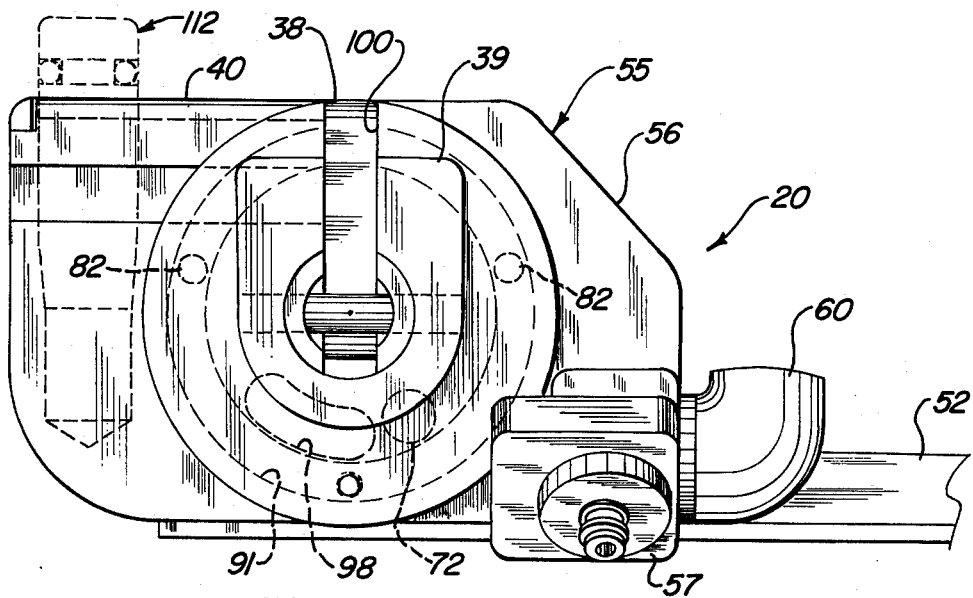
Fig_10
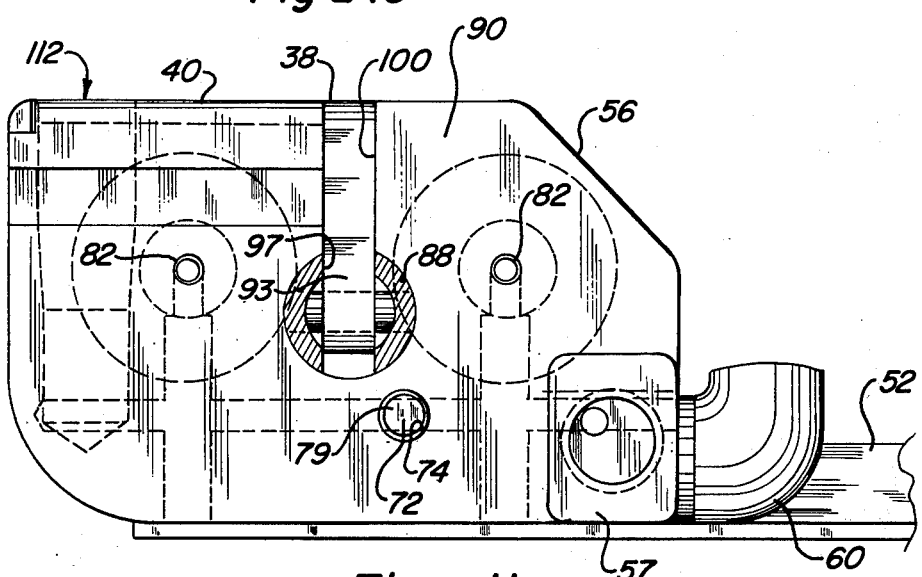
Fig_11
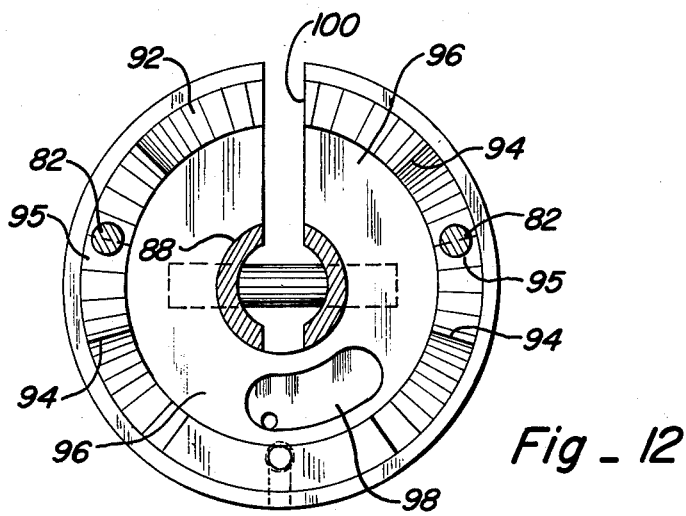
Fig_12

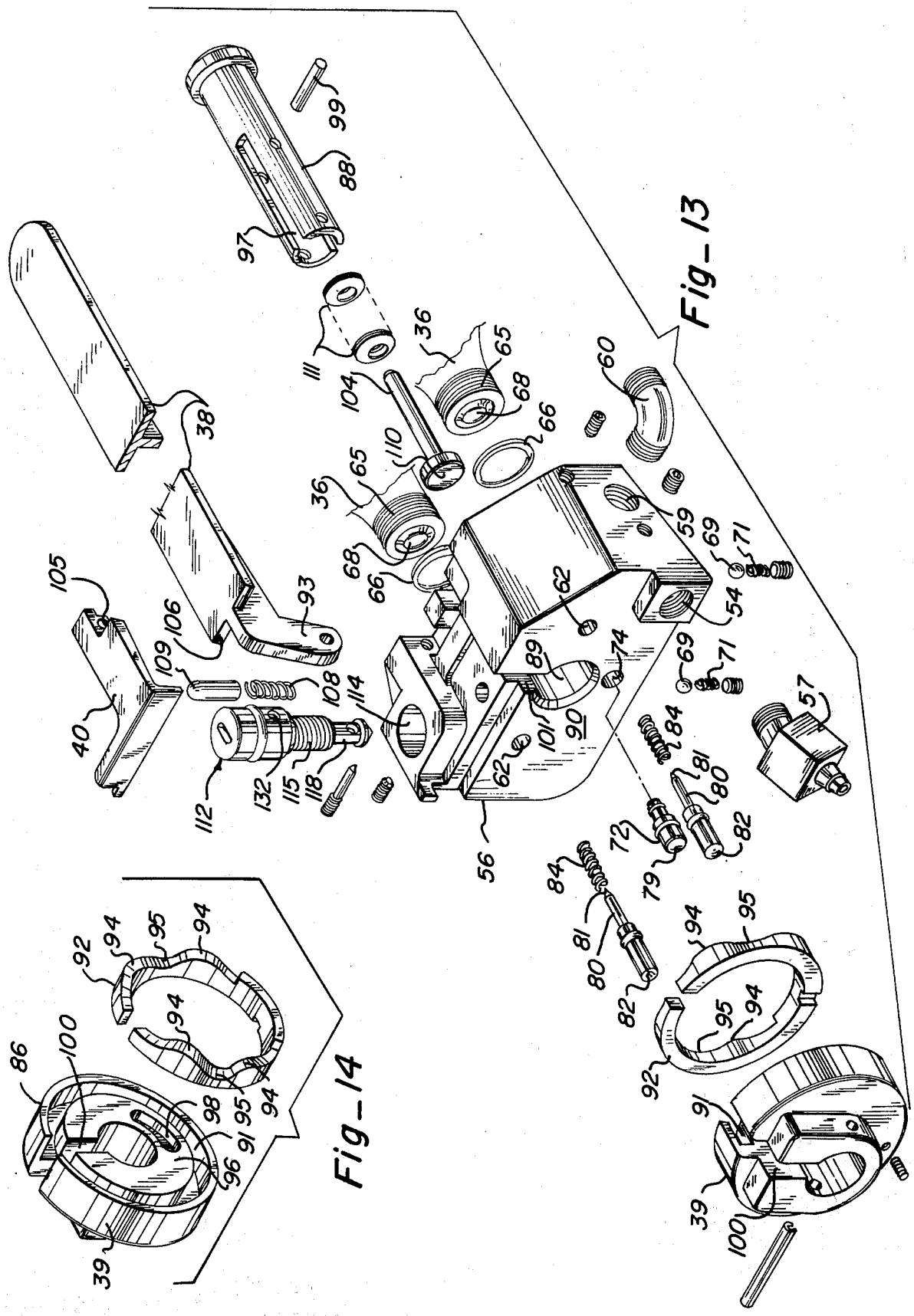

PARACHUTE HARNESS RELEASE MECHANISM

REFERENCE TO GOVERNMENT CONTRACT

The invention described herein was made in the course of or under a contract or subcontract thereunder, with the U.S. Department of Defense.

FIELD OF THE INVENTION

The present invention relates to a parachute hardware release mechanism, and more specifically to a system and apparatus for releasing all or portions of the seat and aircraft mounted restraints and adjunct equipment engaged with the harness in order to free the harness and wearer from such restraints in the event of an emergency during take-off or landing, or after ejection and parachute landing. The release mechanism is adapted for association with conventional parachute harness systems, particularly the integrated torso harness garment worn by the crew members of naval carrier aircraft.

BACKGROUND OF THE INVENTION

An aircraft crewman, particularly in high speed military aircraft, conventionally wears a parachute harness such as a torso restraint garment harness which embodies coupling devices for securing the harness to parachute canopy risers, shoulder restraint straps and survival kit lap belt straps. In addition, the harness provides attachment for an oxygen mask hose and terminal for connection into the oxygen system of the aircraft via the crewman's survival kit. It is desirable, under certain conditions, such as after ejection and parachute landing, or in the event of a ground emergency during landing or take-off procedures, that the crewman be able to rapidly disengage all or portions of the restraint devices and survival kit oxygen system from his harness, and in some circumstances an emergency breathing supply is also necessary. Various systems and devices have been proposed and utilized to accomplish some of these purposes. See, for example, the disconnect coupling and system shown in U.S. Pat. No. 3,872,556, issued Mar. 25, 1975, to Richard H. Frost for "Gas Operated Quick Disconnect Couplings." Note also U.S. Pat. No. 3,785,597, issued Jan. 15, 1974, to John A. Gaylord for "Parachute Harness Release"; U.S. Pat. No. 3,767,143, issued Oct. 23, 1973, to John A. Gaylord for "Quick Release Harness"; and U.S. Pat. No. 3,658,281, issued Apr. 25, 1972, to John A. Gaylord for "Single Release for Parachute Harness."

The present invention is adapted for use with quick disconnect couplings such as shown in U.S. Pat. No. 3,872,556, issued Mar. 25, 1975, to Richard H. Frost for "Gas Operated Quick Disconnect Coupling," or other suitable gas operated quick disconnect couplings known in the art. The Frost coupling embodies certain highly desirable features, and to the extent necessary for a greater understanding of that coupling, reference should be made to that Frost patent.

OBJECTS OF THE INVENTION

The principal object of the present invention is to provide an improved parachute harness release mechanism which mounts directly on a harness, and when actuated selectively releases the harness from parachute canopy risers or alternatively releases the harness from both the parachute canopy risers, the survival kit straps and the oxygen system.

Another object of the present invention is to provide a harness release mechanism of the foregoing character which, upon disconnection from the oxygen system, provides a short term air supply to the harness wearer.

More specifically, it is the objective of the present invention to provide a fail-safe, dual-mode single-point actuated, powered release mechanism for severing connections between a harness and seat mounted shoulder restraints and parachute canopy risers alone or together with the harness wearer's survival kit and its oxygen hose, without removing the harness or oxygen mask and hose from the wearer.

A futher object of the present invention is to provide a single-point control mechanism operable by either hand of the user and enabling him to select the release mode appropriate to his emergency situation.

A further object of the present invention is to provide emergency breathing air to the user simultaneously with the disconnection of the oxygen mask hose from the oxygen supplied via the survival kit.

Still a further object of the present invention is to provide parachute harness release mechanisms of the foregoing character which can be readily reconnected manually in the event of either inadvertent actuation or a change in purpose.

Still a futher object of the present invention is to provide a parachute harness release mechanism in which, after selecting the first mode of releasing the parachute canopy risers and shoulder harness restraints, the user can further actuate the mechanism to disconnect the survival kit and oxygen mask hose restraints, and simultaneously provide a short-term emergency air supply to his oxygen mask.

Still another object of the present invention is to provide a parachute harness release mechanism of the foregoing character which is field installable on existing harness and oxygen mask hose equipment.

Still a further object of the present invention is to provide a parachute harness release mechanism which includes fail-safe provisions that enable the user to disconnect manually from any restraint which does not respond to the system power application, and also reconnect releases quickly and without tools after powered disconnection.

Still a further object of the present invention is to provide parachute harness and oxygen hose release mechanisms and emergency breathing air supply which are fully harness mounted and do not require umbilical or static lines to a seat or other portion of the aircraft structure.

Other objects and advantages of the present invention will become apparent as the following description proceeds. It should be further understood that there is no intention to limit the invention to the specific form disclosed. On the contrary, the intention is to include all modifications, alternative constructions, equivalents and uses falling within the spirit and scope of the invention as expressed in the appended claims.

DESCRIPTION OF THE DRAWINGS

FIG. 1 is a diagram illustrating the present invention in association with a garment type harness.

FIG. 2 is a detailed elevation view of a parachute harness release mechanism embodying the present invention in association with a garment type harness.

FIG. 3 is an isometric illustration of an actuating control device forming a part of the parachute harness release mechanism.

FIG. 4 is a plan view of the actuating device shown in FIG. 3.

FIG. 5 is an elevation view of the actuating device shown in FIG. 4.

FIG. 6 is a section view taken substantially in the plane of line 6—6 on FIG. 4.

FIG. 7 is a section view taken substantially in the plane of line 7—7 on FIG. 4.

FIG. 8 is a section view taken substantially in the plane of line 8—8 on FIG. 4.

FIG. 9 is a section view taken substantially in the plane of line 9—9 on FIG. 5.

FIG. 10 is an end elevation view of the device shown in FIG. 5.

FIG. 11 is a section view taken substantially in the plane of line 11—11 on FIG. 5.

FIG. 12 is a section view taken substantially in the plane of line 12—12 on FIG. 5.

FIG. 13 is an exploded isometric illustration of the actuating device shown in FIG. 3.

FIG. 14 is an isometric view of the opposite side of the cam body and cam ring shown in FIG. 13.

SUMMARY OF THE INVENTION

Figure 17:
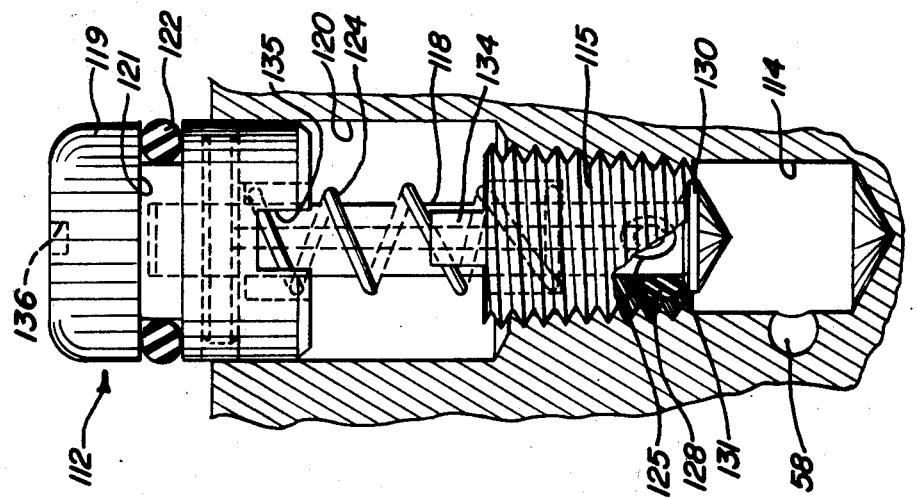
FIG. 17 is a view similar to FIG. 15 but with the indicator-vent valve in the pressure position.

In accordance with the foregoing objects, and as shown in the drawings and described below in detail, the present invention contemplates a parachute harness release mechanism finding particular but not necessarily exclusive utility for use on a parachute harness such as a torso restraint garment or vest harness having releasable buckles for connection with parachute riser and shoulder restraint straps, releasable lap buckles for connection with survival kit and lap belts, and which frequently supports an oxygen mask pressure regulator and hose assembly connectable through a releasable coupling to the oxygen supply conduit from the main aircraft supply and survival kit emergency supply. The harness release mechanism is mounted directly on the harness or vest and includes a control valve carrying a source of compressed air. This source may comprise one or two cylinders containing compressed air under a pressure of about 3000 psi, but hereinafter will be described in the singular sense. The cylinder includes a pierceable seal and is mounted on the control valve in a position for supplying high pressure air to the system upon piercing of the seal. The valve body carries a control handle normally positioned in parallel juxtaposed relation to the cylinder and secured by a releasable latch. A first compressed air chamber in the body is in direct communication with the pierceable seal on the cylinder as well as with the releasable parachute riser shoulder restraint strap quick disconnect buckles through a conduit connected to a high pressure fitting on the control valve. The compressed air seal is punctured by a lance which is actuated by a cam controlled by the valve handle. When the air bottle seal is pierced, compressed air at high pressure is directed through the valve body to the releasable buckles.

The control valve further includes a second chamber which communicates with the first chamber through a slide valve, and further communicates with the releasable buckles connecting the survival kit lap belts as well as with the oxygen hose connector. Upon rotation of the control cam in a second direction, the air cylinder seal is pierced and compressed air flows into the first chamber to actuate the parachute riser strap release buckles, and through the slide valve into the second chamber to actuate the releasable survival kit lap belt buckles as well as the oxygen hose disconnect. At the same time, a portion of the high pressure air flows through a pressure reducer and into the oxygen pressure regulator and mask hose leading to the crewman's oxygen mask in order to supply breathable air to the crewman's mask. A check valve in the oxygen hose prevents the air from escaping through the disconnect coupling.

An indicator vent valve is provided on the control valve to indicate when the system is pressurized and to facilitate the release of pressure from the system when it is desired to permit the various buckles and the oxygen mask hose to be manually reconnected.

The control system provides a dual-mode operation. In the first mode, when the control handle is swung upwardly, high pressure compressed air is supplied only to the disconnect buckles coupling the parachute riser and shoulder restraint straps to the harness. In this mode, the oxygen hose and survival kit connectors remain engaged. The purpose of this mode is primarily to release the crewman from his parachute after a parachute descent. The second mode provided by the control system embodying the present invention is primarily utilized when the crewman desires to escape from the aircraft in the event of an emergency during take-off or landing procedures. This mode releases the crewman completely from all aircraft associated restraints, namely the shoulder and parachute riser restraints as well as the survival kit restraints and the oxygen hose coupling. In the event of an underwater, fire or smoke emergency, it is desirable that the crewman retain his mask and accordingly, the second mode provides a short term breathable air supply to the mask. This enables the crewman to scramble from an aircraft with his mask and harness intact and with a breathable air supply. The present invention thus adds a substantial and important safety feature to the crewman's equipment.

DESCRIPTION OF THE PREFERRED EMBODIMENT

Referring to FIG. 1, the release mechanism 20 embodying the present invention is there diagrammatically shown in association with a parachute harness in the form of a torso restraint harness garment such as a leotard type vest 21. The garment or vest 21 carries shoulder buckles 22 adapted to be secured to parachute canopy riser and shoulder restraint straps 24. The garment also carries lap belt buckles 25 adapted to be secured to survival kit straps 26. An oxygen hose 28, which extends from the survival kit emergency oxygen system, is connected by a coupling 29 to an oxygen mask hose 30 which is secured to the vest 21 or similar over-garment and extends to the crewman's oxygen mask.

Each of the buckles 22, 25, which is desirably the type of releasable coupling described and claimed in U.S. Pat. No. 3,872,556, includes a gas operable quick release element that is engaged with a manually releasable coupling 31, 32 respectively. In addition, a gas powered releasable coupling 34 forms a part of the oxygen hose connector 29 for rapid powered separation of the oxygen hose 28 from the harness mounted hose portion 30. Upon actuation of the quick disconnect couplings, the harness is released from all aircraft associated restraints leaving the crewman free of such impediments. A clean release of all restraints is essential in a pre-flight or post-flight emergency such as may occur during take-off and landing operations. Also of importance to the safety of the crewman is the retention of the vest or harness, which the concomitant advantage residing in the protection afforded by the associated oxygen mask. In the event of a fire, the mask further protects the crewman against smoke and hot gases, and couples with this system's provision of an emergency air supply sufficient to enable the crewman to traverse the fire zone. The concomitant capability for escape from deeply submerged cockpits is even more vital for crewman in naval carrier aircraft, since emergencies that involve ditching are more probable than fire.

In accordance with the present invention, the release actuating mechanism 20, as shown schematically in FIG. 1, is formed by a body 35 to which a pair of compressed air cylinders 36 are secured in parallel. An actuating lever 38 is pivotally mounted relative to the body and serves to actuate a cam mechanism 39 and associated lance and valve mechanisms for selectively releasing compressed air into the system. The lever 38 is initially held in a closed position by a safety latch 40 which must first be depressed in order to release the lever 38. Upon depression of the latch 40, the lever 38 pops up to an angle of about 20°, where it may be readily grasped and swung into operative position. When the lever 38 has been released and swung outwardly to its operative position at about 90° to the unit, it may be either pivoted upwardly in order to direct high pressure compressed air into conduits 41 to the parachute riser release devices 22, or swung downwardly in order to direct compressed air from the cylinders 36, not only into the lines 41 to the parachute riser release devices 22, but also into conduits 42 which lead to the survival kit release devices 25 and a conduit 44 leading to an oxygen hose manifold 45. From the oxygen hose manifold compressed air at high pressure is directed through a second conduit 46 to the oxygen hose release mechanism 34 and, additionally, air is directed through a pressure reducer 48 and thence into a manifold 49 for supplying breathable air through a pressure regulator and conduit 50 to the wearer's oxygen mask for a period of 30 to 60 seconds. It will be noted that upon actuation of the mechanism to release the various releasable couplings, the crewman and his harness are freed from all restraints or connection with the aircraft associated with the release mechanism. He is thus free to escape from the aircraft in the event of an emergency, and is supplied with breathable air for a period long enough to free himself from the cockpit or cabin and reach safety through an intervening hazardous environment, perhaps from 50 feet beneath the sea surface, or through a lake of blazing jet fuel.

A torso restraint garment carrying a dual-mode release actuating mechanism 20 embodying the present invention is shown in more detail in FIG. 2. The torso restraint garment or vest 21 is a body fitting, sleeveless and legless leotard style garment with a front zipper 51. The various belts and straps terminating in the buckles 22, 25 are sewn into and form an integral part of the vest. An oxygen mask hose 30 is conventionally attached to the vest or an overgarment and leads to an oxygen mask (not shown) at the other end through a softer flexible hose 50.

A vest of the character shown in FIG. 2 may be field modified by the addition of the release mechanism embodying the present invention. This is readily accomplished by providing the upper end of the oxygen hose 30 with a manifold assembly continuing a high-pressure portion 45 in series with a pressure reducer 48, and a low-pressure portion 49 in series with a conventional ball-type check valve 49 and the oxygen pressure regulator, and providing the lower end of the hose with a gas-operated quick-releasable coupling 34; by providing each of the buckles likewise with a gas releasable coupling; by securing the control mechanism to the vest by an appropriate mounting plate 52; and by weaving the control conduits 41, 42 through the vest to the various buckles. The control mechanism is generally contoured in such a configuration as to lie flat against the wearer's waist and remain out of the way to prevent inadvertent operation and yet be readily accessible when needed.

The actuating or control device for the release mechanism is shown in detail in FIGS. 3 through 14 inclusive. The control mechanism there shown, indicated generally at 55, constitutes a valve, a gas supply and an actuating mechanism for the valve. The valve is formed by a valve body 56 having a first chamber 58 defined therein and opening into a port 59 in which is secured a first high pressure conduit fitting 60. The chamber 58 further opens into a check valve passage 61 leading to a lance bore 62 which in turn opens into an interiorly threaded counterbore 64 adapted to receive the sealed, threaded end 65 of an elongated compressed air cylinder 36. The cylinder end 65 is threaded into the counterbore 64 and seats against an O-ring seal 66 which in turn surrounds a puncturable seal 68 in the end of the cylinder 36. In the configuration shown, a pair of compressed air cylinders 36 is utilized, with the foregoing passage and seal structure being provided in duplicate. Each cylinder 36 is shaped similarly to the well known Sparklet bottle, and contains compressed air at a pressure of about 3000 psi.

A cam actuated lance mechanism, which will be described in more detail below, is positioned in the lance passage 62 for piercing the seal 68 in the end of the compressed air cylinder 36 when the system is actuated, thereby supplying compressed air to the first chamber 58. To prevent a back flow of air, a ball check valve 69 is provided in the check valve passage 61, with the ball 69 being held against an annular seat 70 defined in the passage 61 by a coil spring 71.

The first high pressure fitting 60 in communication with the first chamber 58 is in turn connected to the conduits 41 leading to the gas operated disconnect devices 22 forming a part of the buckles 22 engaging the parachute risers and shoulder restraint straps 24. The application of compressed air into the first chamber 58 serves to disconnect the gas operable quick release element of the buckle devices 22 and thereby release the parachute riser and shoulder restraint straps from the harness.

For releasing the remaining disconnect devices and couplings, the valve body 56 is provided with a second chamber 53 opening into a threaded port 54 into which is mounted a second high pressure fitting 57. Secured in turn to the second high pressure fitting 57 are the conduits 42 leading to the survival kit lap belt disconnect couplings 25 and the conduit 44 leading to the oxygen hose coupling disconnect device 34.

For controlling communication between the first compressed air chamber 58 and the second compressed air chamber 53, there is provided a cam controlled slide valve 72. This valve is formed by a passage 74 communicating between the first and second chambers 58 and 53 respectively, and defining a valve chamber wall 75 against which a valve poppet 76 is sealingly engaged. The poppet 76 includes a valve stem 78 the outer end of which defines a cam follower 79. The slide valve passage 74 opens into the same outer surface of the valve body as the lance ports 62 and in close juxtaposition therewith. The slide valve 72 is held in the seated or closed position, to prevent communication between the first and second chambers 58, 53 respectively, by the cam 39. When the cam 39 is rotated by swinging the handle 38 downwardly, in the second mode position, the slide valve 72 is released and opened by the pressure in the first chamber, thereby permitting compressed air to flow from the first chamber 58 into the second chamber 53 and thence outwardly through the high pressure fitting 57 into the various conduits 42, 44 to the release couplings 25 and via the manifold 45 and conduit 46 to the hose release coupling 34 respectively, to release the same and free the harness from the associated restraints formed by the survival kit straps 26 and oxygen hose 28.

For piercing the sealed end of the inserted cylinder 36 a sharpened lance 80 is slidingly and sealingly mounted in the lance port. The lance includes a sharply pointed end 81 for piercing the seal 68 at the inserted end of the cylinder 36, and an elongated follower end 82 for engagement by the cam mechanism 39. The lance is biased outwardly of the lance passage by a coil spring 84 and is slidingly sealed therein by an appropriate O-ring 85. As indicated above, when two cylinders 36 are utilized, the lance mechanism is provided in duplicate.

The cam mechanism 39, upon rotation in either direction from its neutral position, in response to swinging the handle 38 either up or down, drives the lance or lances 80 inwardly to pierce the seal 68 on the cylinders 36 and thereby release high pressure compressed air into the lance bore 62. From the lance passage 62, the compressed air flows past the ball valve 69 and into the first chamber 58. From the first chamber 58, compressed air is directed through the high pressure fitting 60 into the conduits 41 leading to the disconnect couplings 22 to release the parachute risers from the harness vest. When the handle 38 is swung downwardly to rotate the cam in the second mode, the lances are likewise actuated to pierce the seals 68 on the bottles 36 and release compressed air at high pressure into the first chamber 58. In this mode, however, the cam also releases the slide valve 72 thereby permitting the high pressure compressed air from first chamber 58 to flow into the second chamber 53 and thence into the remaining conduits 42, 44 to effect a release of the lap belt connectors and oxygen hose coupling.

The cam mechanism 39 is formed by a cam housing 86 secured to a hollow or sleeve shaft 88 which is journaled in a corresponding bore 89 in the valve body 56. The cam housing 86 is positioned against the body and overlies the lance passages 62 and the slide valve passage 74 opening into the face 90 of the body on which the cam housing 86 is mounted. The cam housing 86 and shaft 88 rotate by movement of the handle 38. For actuating the lances 80 in response to rotation of the cam, the cam housing includes an annular groove 91 in which is mounted a generally annular shaped strip cam 92 having on its face raised cam ridges 94 and corresponding depressions or valleys 95. As the cam housing 86 is rotated, the ridges 94 bear against the projecting enlongated end 82 of the lance 80 to drive the lance forceably inwardly to pierce the seal 68 on the compressed air cylinder 36. When the cam is in its neutral position, the elongated end 82 of the lance rests in the depression or valley 95 on the cam ring 92.

When the cam housing is mounted against the valve body, the inner face 96 of the cam housing, at a point radially inwardly of the cam ring 92 engages the slide valve 72 and holds the same into sealed position between the first chamber 58 and the second chamber 53. To release the slide valve 72, the cam housing further defines on its inner face a recess or depression 98 which when the cam is rotated into its second mode position allows the slide valve to project outwardly into the cam and hence open the passages 74 between the first chamber 58 and second chamber 53.

The actuating handle 38 includes an L-shaped arm 93 pivotally mounted through a slot 97 in the shaft 88 by pin 99 for swinging movement within a slot 100 defined in the cam housing 86. A corresponding slot 101 is cut in the surface of the body 56 into which the handle lever 93 is positioned when the cam is in its neutral configuration and the handle 38 lies in closed or inactive position along the air cylinders 36. The handle 38 and associated lever arm 93 form a generally L-shaped handle which when swung fully outwardly is received within the outer end of the shaft and cam housing enabling the cam to be rotated. When nested against the valve body and air cylinders, the handle effectively locks the cam and prevents rotation of the cam and inadvertent actuation of the sytem.

In order to enable the user to grasp the handle, and yet prevent accidental operation, the latch 40 holds the handle in its closed position with the cam in neutral. To this end, the latch 40 is pivotally mounted on the valve body 56 and is provided with an interfering edge 105 which abuts a similarly disposed edge 106 on the lever handle 38. The latch is biased to an upward locking position by a latch biasing spring 108 and plunger 109 acting between the valve body and the underside of the latch 40. By pressing downwardly on the latch against the valve body, the interfering surfaces 105, 106 are disengaged allowing the handle 38 to swing upwardly. For biasing the handle upwardly into position where it may be grasped by the user, a spring biased plunger 104 is mounted axially in the cam shaft 88 and is provided with a chamfered head 110 which bears against the depending arm portion 93 of the handle and acts to raise the handle 38 to a position at an angle of about 20° from the compressed air cylinders where it may be readily grasped for use. The springs 111 are preferably of the Belleville type to provide a strong spring force with limited movement. Once released, handle is further swung outwardly to a point where the handle 38 extends generally at right angles to the assembly and the depending arm 93 is positioned within the cam shaft and housing. During this movement the plunger 104 serves to provide resistance to the handle and as a detent to hold the handle in its outward position. With the handle fully extended, the cam may be rotated into the first mode or second mode positions to effect the desired releasing operation as shown in FIG. 3 in dotted lines by swinging the handle either up or down.

Figure 16:
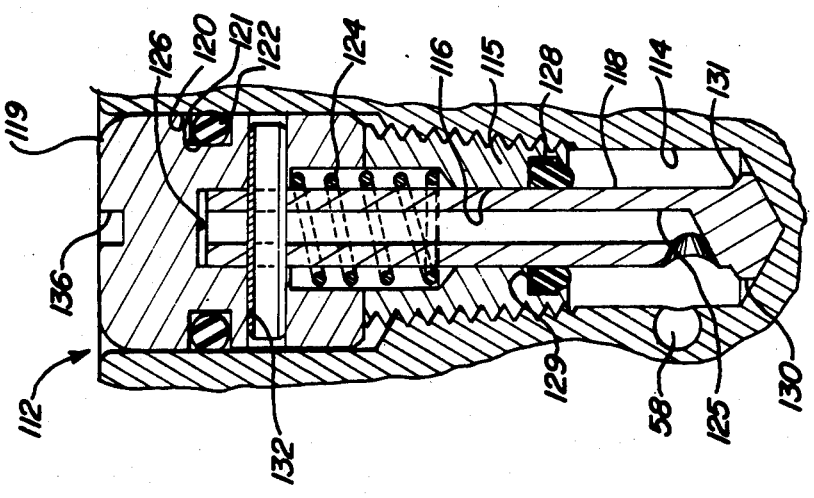
FIG. 16 is a section view taken substantially in the plane of line 16—16 on FIG. 15.
Figure 15:
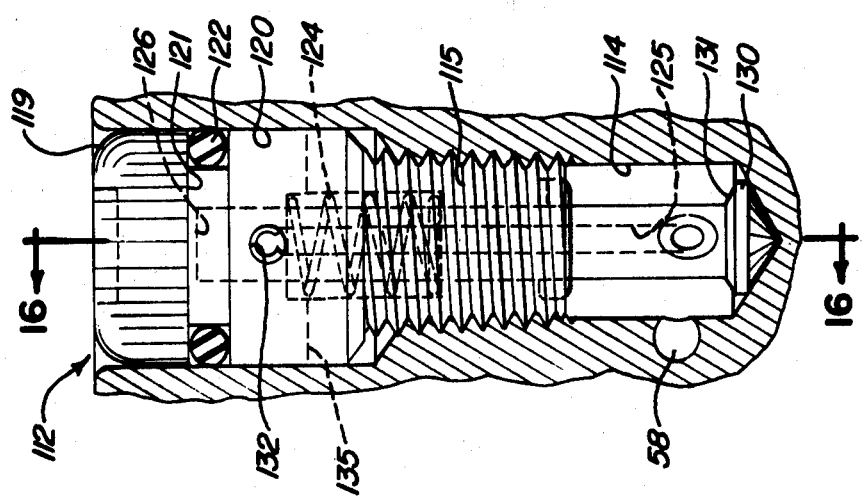
FIG. 15 is an enlarged elevation view of a pressure indicator-vent valve in the no pressure position.

For purposes of indicating when the system is under pressure, or to signal a leakage from one of the compressed air cylinders, there is provided a gas pressure indicator 112 mounted in an indicator passage 114 in the valve or control body 56. The indicator passage 114 is in communication with the first pressure chamber 58 and the indicator reacts in response to an increase in pressure in that chamber by projecting outwardly from the valve body thereby giving a visible indication that there is pressure in the system. The pressure indicator further serves as a vent valve. Upon depressing the indicator, air pressure within the system is exhausted to the atmosphere. If desired, the various connectors may then be manually reengaged. Referring to FIGS. 15 through 17, the indicator-vent valve is formed by a valve body 115 threadably mounted in the indicator passage 114. The valve body 115 is generally sleeve shaped and defines a central axial bore 116 which slidably receives a valve stem 118. At its upper or outer end, the valve stem 118 is secured to an indicator button cap 119 which is telescopingly received in a counterbore 120 forming an extension of the indicator bore 114. The button cap 119 is provided with an annular groove 121 receiving an O-ring seal 122 which sealingly engages the side wall of the counterbore 120 when the button cap 119 and stem 118 are pushed downwardly into the indicator bore. A light coil spring 124 surrounds the stem 118 and acts between the valve body 115 and the button cap 119 to provide an upward twist bias on the latter. The strength of the spring is such, however, that the friction between the seal 122 and the wall of the counterbore 120 holds the button inwardly against the force of the spring until a positive pressure is exerted in the system.

In order that system pressure will force the button outwardly to give an indication of system pressure, the valve stem 118 is provided with an axial bore 125 which opens into a central chamber 126 in the button cap. The valve stem 118 is sealed within the axial passage 116 in the valve body 115 by an O-ring 128 surrounding the valve stem and supported in an annular groove 129 in the bottom end of the valve sleeve or body 115. Air pressure in the system forces the cap outwardly of the counterbore.

In order to prevent loss of air pressure when the system is pressurized to actuate the various disconnect devices, the valve stem is provided with an enlarged flange seat 130 on its lower end defining a frusto-conical sealing surface 131 which sealingly engages the O-ring 128 on the valve body 115 when the valve stem and button cap have been raised under the force of pressure in the system.

To provide a vent for the system, the button cap is provided with a transverse passage 132 communicating with the central stem passage 125. The transverse passage 132 opens below the cap seal 122 initially to prevent the escape of air so that the button cap pops out of the control valve. By pushing on the button cap, however, the stem seal is opened allowing pressure in the system to vent through the stem passage 125 and transverse passage 132 to the atmosphere.

To reset the indicator and vent valve, a mechanic having knowledge of the valve configuration must push the button cap inwardly until the cap seal 122 sealingly engages the side wall of the counterbore 120. To prevent inadvertent or unintentional resetting, a tongue 134 extends upwardly from the valve sleeve body 115 and must engage in a notch 135 in the button cap. The spring 124 rotates the cap slightly so that the tongue and notch are out of alignment. The mechanic resetting the indicator must utilize a screw driver in a slot 136 in the button cap to rotate the cap sufficiently against the force of the spring to allow the tongue 134 to slip into the notch 135 so that the button cap can be fully seated in the counterbore.

We claim:

1. A parachute harness release mechanism for use on a parachute harness embodying releasable couplings for connection with parachute riser straps, releasable couplings for connection with survival kit lap belts, and an oxygen mask hose terminating in a releasable coupling for connection with an oxygen supply conduit, said mechanism comprising, in combination:
   a. a single restraint free multi-positional control means mounted on said harness for selectively releasing said releasable couplings and having
      1. a first operational position selectable for releasing only the riser strap couplings,
      2. a second operational position selectable for releasing all of the harness mounted couplings simultaneously,
   b. and means operative in response to said second position operation of said selectively releasing means for supplying air to said oxygen mask hose.

2. A parachute harness release mechanism as defined in claim 1 wherein said releasing means includes a high pressure gas power source.

3. A parachute harness release mechanism as defined in claim 1 wherein said releasing means includes a compressed air power source.

4. A parachute harness release mechanism as defined in claim 1 wherein said releasing means includes a high pressure gas power source and said supplying means includes a source of breathable air.

5. A release mechanism for use with a parachute harness having releasable buckles for connection with parachute riser straps, releasable buckles for connection with survival kit lap belts, and a releasable oxygen supply conduit connector for connecting an oxygen supply conduit to an oxygen mask hose, said release mechanism comprising, in combination:
   a. a source of compressed air,
   b. means for activating said source to release said compressed air,
   c. single restraint free, mulit-positional means for directing said compressed air to selected releasable buckles to release, in a first operational position, only the parachute riser straps and to release, in a second operational position, all of said releasable buckles and said oxygen supply conduit connector,
   d. and means responsive to said second position operation of said directing means for supplying low pressure air to the oxygen mask hose.

6. A parachute harness release mechanism for use on a parachute harness having releasable buckles for connection with parachute riser straps, releasable buckles for connection with survival kit lap belts, and an oxygen mask hose terminating in a releasable coupling for connection with an oxygen supply conduit; said mechanism comprising, in combination:
   a source of compressed air comprising a cylinder containing air under pressure of about 3000 psi, said cylinder having a seal pierceable to release the air, and a threaded end adjacent the seal;
   a control valve for releasing said compressed air and selectively supplying said air to said releasable buckles, releasable coupling, and oxygen mask hose, comprising:
      a valve body sealingly mounting said cylinder,
      a control handle normally positioned in parallel juxtaposed relation with said cylinder, a latch releasably engaging said handle for releasing said handle into operative position and for preventing inadvertent operation thereof, a spring biasing said handle towards its operative position against the holding action of said latch, a first compressed air chamber in said body, a threaded port communicating with said chamber for sealingly receiving the threaded end of said cylinder, a lance slidably and sealingly mounted in said body and projecting into said threaded port for piercing said seal to release said compressed air into said first chamber, a control cam rotatably mounted on said body and pivotally engaged with said control handle, said cam upon rotation in either direction from a neutral position engaging and sliding said lance into piercing engagement with said cylinder seal for releasing said compressed air into said first chamber, a second compressed air chamber in said body, a slide valve between said first and second chambers for preventing compressed air from flowing from said first chamber into said second chamber, and a valve stem on said slide valve normally engaged by said cam for holding said valve in the closed position when said cam is in the neutral and a first rotative configuration and for following said cam for releasing said valve to open communications between said first and second chambers when said cam is in a second rotative configuration;

first conduits connecting said first chamber to the releasable parachute riser buckles for supplying compressed air to release said buckles when said control handle and cam are positioned in both the first and second rotative configurations, second conduits connecting said second chamber to the releasable survival kit lap belt buckles and the releasable oxygen supply coupling for supplying compressed air to release said buckles and coupling when said control handle and cam are positioned in the second rotative configuration, a pressure reducing device communicating with said second conduits for supplying low pressure air to the oxygen mask hose when compressed air is supplied to said first and second conduits to release all buckles and the oxygen hose coupling from the parachute harness, a check valve for preventing escape of air through the disconnected oxygen hose, and means for discharging compressed air from the system after actuation to facilitate manual reconnection of the releasable buckles and oxygen hose coupling.

7. A parachute harness release mechanism for use on a parachute harness having releasable buckles for connection with parachute riser straps, releasable buckles for connection with survival kit lap belts, and an oxygen mask hose terminating in a releasable coupling for connection with an oxygen supply conduit; said mechanism comprising, in combination:

a source of compressed air comprising a cylinder containing air under pressure, said cylinder having a seal piercable to release the air, a control valve for releasing said compressed air from said cylinder and selectively supplying said air to said releasable buckles, releasable coupling, and oxygen mask hose comprising:

a valve body sealingly mounting said cylinder, a first compressed air chamber in said body communicating with said cylinder, a lance slidably and sealingly mounted in said body for piercing said seal to release said compressed air into said first chamber, a control cam rotatably mounted on said body and pivotally engaged with a control handle, said cam upon rotation in either direction from a neutral position engaging and sliding said lance into piercing engagement with said cylinder seal for releasing said compressed air into said first chamber, a second compressed air chamber in said body, a normally open valve between said first and second chambers, and said cam engaging and holding said valve in the closed position when said cam is in the neutral and a first rotative configuration and releasing said valve to open communications between said first and second chambers when said cam is in a second rotative configuration;

first conduits connecting said first chamber to the releasable parachute riser buckles for supplying compressed air to release said buckles when said cam is positioned in both its first and second rotative configurations, second conduits connecting said second chamber to the releasable survival kit lap belt buckles and the releasable oxygen supply coupling for supplying compressed air to release said buckles and coupling when said cam is positioned in its second rotative configuration, and a pressure reducing device communicating with said second conduits for supplying low pressure air to the oxygen mask hose when compressed air is supplied to said first and second conduits to release all buckles and the oxygen hose coupling from the parachute harness.

8. A parachute harness release mechanism for use on a parachute harness having releasable buckles for connection with parachute riser straps, releasable buckles for connection with survival kit lap belts, and an oxygen mask hose terminating in a releasable coupling for connection with an oxygen supply conduit; said mechanism comprising, in combination:

a source of compressed air comprising a cylinder containing air under pressure of about 3000 psi, said cylinder having a seal piercable to release the air, and a threaded end adjacent the seal, a control valve for controllably releasing said compressed air and having first and second configurations for selectively supplying said air to said releasable buckles, releasable coupling, and oxygen mask hose, first conduits connecting said control valve to the releasable parachute riser buckles for supplying compressed air to release said buckles when said control valve is positioned in both its first and second configurations, second conduits connecting said control valve to the releasable survival kit lap belt buckles and the releasable oxygen supply coupling for supplying compressed air to release said buckles and coupling when said control valve is positioned in its second configuration, and a pressure reducing device communicating with said second conduit for supplying low pressure air to the oxygen mask hose when compressed air is supplied to said first and second conduits to release all buckles and the oxygen hose coupling from the parachute harness.

9. A parachute harness release mechanism for use on a parachute harness embodying releasable couplings for connection with parachute riser straps and releasable couplings for connection with survival kit lap belts, said mechanism comprising, in combination:
single, restraint free, multi-positional control means mounted on said harness for selectively releasing said releasable couplings, means operative in response to the manual positioning of said control means in a first position for releasing only the riser strap couplings, and means operative in response to the manual positioning of said control means in a second position for releasing all of the harness mounted couplings simultaneously.

10. A parachute harness release mechanism as defined in claim 9 wherein said control means includes a high pressure gas power source.

11. A parachute harness release mechanism as defined in claim 9 wherein said control means includes a compressed air power source.

12. A parachute harness release mechanism for use on a parachute harness having releasable buckles for connection with parachute riser straps and releasable buckles for connection with survival kit lap belts, said mechanism comprising, in combination:
a source of compressed air comprising a cylinder containing air under pressure of about 3000 psi, said cylinder having a seal pierceable to release the air, and a threaded end adjacent the seal;
a control valve for releasing said compressed air and selectively supplying said air to said releasable buckles, comprising:
a valve body sealingly mounting said cylinder,
a control handle normally positioned in parallel juxtaposed relation with said cylinder,
a latch releasably engaging said handle for releasing the same into operative position and for preventing inadvertent operation thereof,
a spring biasing said handle towards its operative position against the holding action of said latch,
a first compressed air chamber in said body,
a threaded port communicating with said chamber for sealingly receiving the threaded end of said cylinder,
a lance slidably and sealingly mounted in said body and projecting into said threaded port for piercing said seal to release said compressed air into said first chamber,
a control cam rotatably mounted on said body and pivotally engaged with said control handle, said cam upon rotation in either direction from a neutral position engaging and sliding said lance into piercing engagement with said cylinder seal for releasing said compressed air into said first chamber,
a second compressed air chamber in said body,
a slide valve between said first and second chambers for preventing compressed air from flowing from said first chamber into said second chamber, and
a valve stem on said slide valve normally engaged by said cam for holding said valve in the closed position when said cam is in the neutral and a first rotative configuration and for following said cam for releasing said valve to open communications between said first and second chambers when said cam is in a second rotative configuration;
first conduits connecting said first chamber to the releasable parachute riser buckles for supplying compressed air to release said buckles when said control handle and cam are positioned in both the first and second rotative configurations,
and second conduits connecting said second chamber to the releasable survival kit lap belt buckles for supplying compressed air to release said buckles when said control handle and cam are positioned in the second rotative configuration, and
means for discharging compressed air from the system after actuation to facilitate manual reconnection of the releasable buckles.

13. A release mechanism for use with a parachute harness having releasable buckles for connection with parachute riser straps, releasable buckles for connection with survival kit lap belts, and a releasable oxygen supply conduit connector for connecting an oxygen supply conduit to an oxygen mask hose, said release mechanism comprising, in combination:
a. a source of compressed air;
b. means for activating said source to release said compressed air;
c. a multi-positional means for directing said compressed air to selected releasable buckles to release, in a first operational position, only the parachute riser straps and to release, in a second operational position, all of said releasable buckles and said oxygen supply conduit connector;
d. means responsive to said second position operation of said directing means for supplying low pressure air to the oxygen mask hose; and
e. an indicator for indicating air leakage from said compressed air source.

14. A release mechanism for use with a parachute harness having releasable buckles for connection with parachute riser straps, releasable buckles for connection with survival kit lap belts, and a releasable oxygen supply conduit connector for connecting an oxygen supply conduit to an oxygen mask hose, said release mechanism comprising, in combination:
a. a source of compressed air comprising a pair of sealed cylindrical bottles in parallel;
b. means for activating said source by puncturing said sealed bottles to release said compressed air;
c. a multi-positional means for directing said compressed air to selected releasable buckles to release, in a first operational position, only the parachute riser straps and to release, in a second operational position, all of said releasable buckles and said oxygen supply conduit connector; and
d. means responsive to said second position operation of said directing means for supplying low pressure air to the oxygen mask hose.

15. A release mechanism as defined in claim 14 wherein said activating means comprises a pair of cam operated simultaneously actuated lances.

16. A release mechanism for use with a parachute harness having releasable buckles for connection with parachute riser straps, releasable buckles for connection with survival kit lap belts, and a releasable oxygen supply conduit connector for connecting an oxygen supply conduit to an oxygen mask hose, said release mechanism comprising, in combination:
 a. a source of compressed air,
 b. means for activating said source to release said compressed air,
 c. means positionable in a selected one of two positions for directing said compressed air to selected releasable buckles and the oxygen supply conduit connector, said directing means, when positioned in a first position, directing compressed air to release only the parachute riser straps, and said directing means including a slide valve operable in response to the positioning of said directing means in a second position for releasing all of said buckles and said oxygen supply conduit connector; and
 d. means responsive to said second position operation of said directing means for supplying low pressure air to the oxygen mask hose.

17. A release mechanism for use with a parachute harness having releasable buckles for connection with parachute riser straps, releasable buckles for connection with survival kit lap belts, and a releasable oxygen supply conduit connector for connecting an oxygen supply conduit to an oxygen mask hose, said release mechanism comprising, in combination:
 a. a source of compressed air,
 b. means for activating said source to release said compressed air, and
 c. a multi-positional means for directing said compressed air to selected releasable buckles to release, in a first operational position, only the parachute riser straps and to release, in a second operational position, all of said releasable buckles and said oxygen supply conduit connector, said directing means comprising a first chamber communicating with said compressed air source and said releasable parachute riser strap buckles, a second chamber communicating with said releasable survival kit lap belt buckles, said releasable oxygen supply conduit connector, and said low pressure air supplying means, and valve means for connecting said second chamber to said first chamber when said directing means is in said second position operation.

18. A release mechanism for use with a parachute harness having releasable buckles for connection with parachute riser straps and releasable buckles for connection with survival kit lap belts, said release mechanism comprising, in combination:
 a. a source of compressed air;
 b. means for activating said source to release said compressed air;
 c. a multi-positional means for directing said compressed air to selected releasable buckles to release, in a first operational position, only the parachute riser straps and to release, in a second operational position, all of said releasable buckles; and
 d. an indicator for indicating air leakage from said compressed air source.

19. A release mechanism for use with a parachute harness having releasable buckles for connection with parachute riser straps and releasable buckles for connection with survival kit lap belts, said release mechanism comprising, in combination:
 a. a source of compressed air comprising a pair of sealed cylindrical bottles in parallel;
 b. means for activating said source by puncturing said sealed bottles to release said compressed air; and
 c. a multi-positional means for directing said compressed air to selected releasable buckles to release, in a first operational position, only the parachute riser straps and to release, in a second operational position, all of said releasable buckles.

20. A release mechanism as defined in claim 19 wherein said activating means comprises a pair of cam operated simultaneously actuated lances.

21. A release mechanism for use with a parachute harness having releasable buckles for connection with parachute riser straps and releasable buckles for connection with survival kit lap belts, said release mechanism comprising, in combination:
 a. a source of compressed air;
 b. means for activating said source to release said compressed air;
 c. means positionable in a selected one of two positions for directing said compressed air to selected releasable buckles, said directing means, when positioned in a first position directing compressed air to release only the parachute riser straps, and said directing means including a slide valve operable in response to the positioning of said directing means in a second position for releasing all of said buckles.

22. A release mechanism for use with a parachute harness having releasable buckles for connection with parachute riser straps and releasable buckles for connection with survival kit lap belts, said release mechanism comprising, in combination:
 a. a source of compressed air;
 b. means for activating said source to release said cmpressed air;
 c. a multi-positional means for directing said compressed air to selected releasable buckles to release, in a first operational position, only the parachute riser straps and to release, in a second operational position, all of said releasable buckles, said directing means comprising a first chamber communicating with said compressed air source and said releasable parachute riser strap buckles, a second chamber communicating with said releasable survival kit lap belt buckles, and valve means for connecting said second chamber to said first chamber when said directing means is in said second position operation.

* * * * *